United States Patent
Saccon et al.

(10) Patent No.: US 7,067,766 B2
(45) Date of Patent: Jun. 27, 2006

(54) SOLID STATE SWITCH FOR ARC WELDING

(76) Inventors: Gino Saccon, P.O. Box 1526, Kent, WA (US) 98035; Jeff Jouper, 14627 SE. 140th St., Renton, WA (US) 98035

(*) Notice: Subject to any disclaimer, the term of this patent is extended or adjusted under 35 U.S.C. 154(b) by 204 days.

(21) Appl. No.: 10/701,198

(22) Filed: Nov. 4, 2003

(65) Prior Publication Data

US 2004/0089645 A1    May 13, 2004

Related U.S. Application Data

(60) Provisional application No. 60/423,540, filed on Nov. 4, 2002.

(51) Int. Cl.
*B23K 9/10* (2006.01)

(52) U.S. Cl. .............................. 219/130.21
(58) Field of Classification Search ........... 219/130.51, 219/130.21, 130.31, 130.32, 130.33
See application file for complete search history.

(56) References Cited

U.S. PATENT DOCUMENTS

| 4,479,046 | A |   | 10/1984 | Mizuno et al. |
|---|---|---|---|---|
| 4,507,542 | A |   | 3/1985 | Kunz et al. |
| 4,594,498 | A | * | 6/1986 | Ueguri et al. .......... 219/130.51 |
| 4,620,082 | A |   | 10/1986 | Graville et al. |
| 4,686,350 | A | * | 8/1987 | Bodewig ............... 219/130.51 |
| 5,357,078 | A |   | 10/1994 | Smith et al. |
| 2002/0038795 | A1 |   | 4/2002 | Katoonka et al. |

FOREIGN PATENT DOCUMENTS

JP           61-279366  A   *  12/1986  ............ 219/130.51

* cited by examiner

*Primary Examiner*—Clifford C. Shaw
(74) *Attorney, Agent, or Firm*—Black Lowe & Graham PLLC

(57) ABSTRACT

A solid-state contactor for an arc welder is provided. The contactor includes a processor assembly configured to generate a logical signal. The processor assembly includes an output and a processor. The processor is configured to generate the logical signal at the output. A switch is configured to conduct electrical current from a power source to a wire conductor in response to the logical signal at the output.

20 Claims, 5 Drawing Sheets

LN-25 TRUTH TABLE

| INPUTS | | | | | OUTPUTS | |
|---|---|---|---|---|---|---|
| MOTOR FEED | OVER CUR 1 | OVER CUR 2 | OVER TEMP | TRIGGER ON | MOTOR | SS_CONTROL |
| T | X | X | X | X | ON | OFF |
| F | T | X | X | X | OFF | OFF |
| F | F | T | X | X | OFF | OFF |
| F | F | F | T | X | OFF | OFF |
| F | F | F | F | F | OFF | OFF |
| F | F | F | F | T | ON | ON |

SOLID STATE SWITCH FOR ARC WELDING

PRIORITY CLAIM

This application claims priority from the provisional application entitled, "Welder Patent" Serial No. 60/423,540 filed on Nov. 4, 2002 and incorporated by reference.

FIELD OF THE INVENTION

This invention relates generally to arc welding and, more specifically, to power regulator technology.

BACKGROUND OF THE INVENTION

Present wire-feed welders in industry rely on motor feed rates to control output current by controlling the burn rate of the wire. The faster the motor feeds the wire, the higher the output current. Generally, where current is controlled by motor feed, the voltage may drop as the current need rises. As the user gains greater experience with the equipment, the user may adjust both the input voltage and the motor feed rate to achieve a proper weld. Sometimes, however, the experience is gained by ruining either the welded material or the weld.

In a welder, an electromechanical switch known as a contactor, is used to feed power source current through the electrode. Because the electromechanical switch relies upon moving contacts to turn the current ON and OFF, arcing at electrical contacts within the contactor in the power source. Thus, operation leads to degradation of performance. The degradation of performance is exhibited in an increased contact resistance that causes an equal decrease in output voltage and current. With continued use, these devices will self-destruct by overheating and eventually fail. During the period leading up to the total failure of the power source, the power provided at the welding arc will produce degraded welds. The nature of the degraded welds will require extensive and expensive rework of those welds.

What is needed is a solid-state power supply for wire feed welding in constant current and constant voltage modes that will neither arc nor degrade in performance during operation.

SUMMARY OF THE INVENTION

A solid-state contactor for an arc welder is provided. The contactor includes a processor assembly configured to generate a logical signal. The processor assembly includes an output and a processor. The processor is configured to generate the logical signal at the output. A switch is configured to conduct electrical current from a power source to a wire conductor in response to the logical signal at the output.

An embodiment of the invention includes a power source, a motor assembly for feeding electrode wire, a solid-state control circuitry for controlling current and voltage, and voltage and current sensing circuits feeding the control circuitry. Solid-state control circuitry is used to feed the power source current through the electrode wire in order to produce an arc .weld. The solid-state control circuitry monitors input voltage, output voltage, motor speed, and output current to control a bi-directional switch.

Algorithms defining control parameter are conditioned upon wire type, flux material, and type of metal to be welded. Algorithms are pre-programmed into the microcontroller for several wire types. The control select switches determine wire type used for welding.

This invention uses a solid state switch to turn off and on power to the electrode tip as well as to pulse-width modulate the power to the electrode in order to precisely control both voltage and current. By the nature of the mechanical switch present in the existing art, pulse width modulation cannot be achieved and is therefore not suitable for precise control of the output voltage and current. The control circuitry of an embodiment of the invention monitors motor speed, switched current and output voltage, and then compares these signals to a reference value set by the user to precisely control the weld parameters.

The solid-state switch has no moving parts, an extremely low ON resistance, precisely controlled current limit and pulse width modulation control to properly control voltage and current to the electrode tip. The solid-state switch contains a control circuit to monitor the current through the switch, a thermal limit device to monitor switch temperature, and signals related to ON/OFF control of the switch. A thermal sensor monitors the ambient temperature of the bi-directional switch and will disable the switch and interrupt the output current should an over temperature condition exist.

The motor circuitry is driven by the controller section to control the speed of the wire feed. A speed sense circuit feeds speed information back to the control section to form a closed loop motor speed controller.

As will be readily appreciated from the foregoing summary, the invention provides a ready substitute for the existing mechanical contactors present in wire feeders available on the market.

BRIEF DESCRIPTION OF THE DRAWINGS

The preferred and alternative embodiments of the present invention are described in detail below with reference to the following drawings.

FIG. 5 is a truth table that defines the basic operation of the controller.

DETAILED DESCRIPTION OF THE PREFERRED EMBODIMENT

A solid-state contactor for an arc welder is provided. The contactor includes a processor assembly configured to generate a logical signal. The processor assembly includes an output and a processor. The processor is configured to generate the logical signal at the output. A switch is configured to conduct electrical current from a power source to a wire conductor in response to the logical signal at the output.

Figure 1:
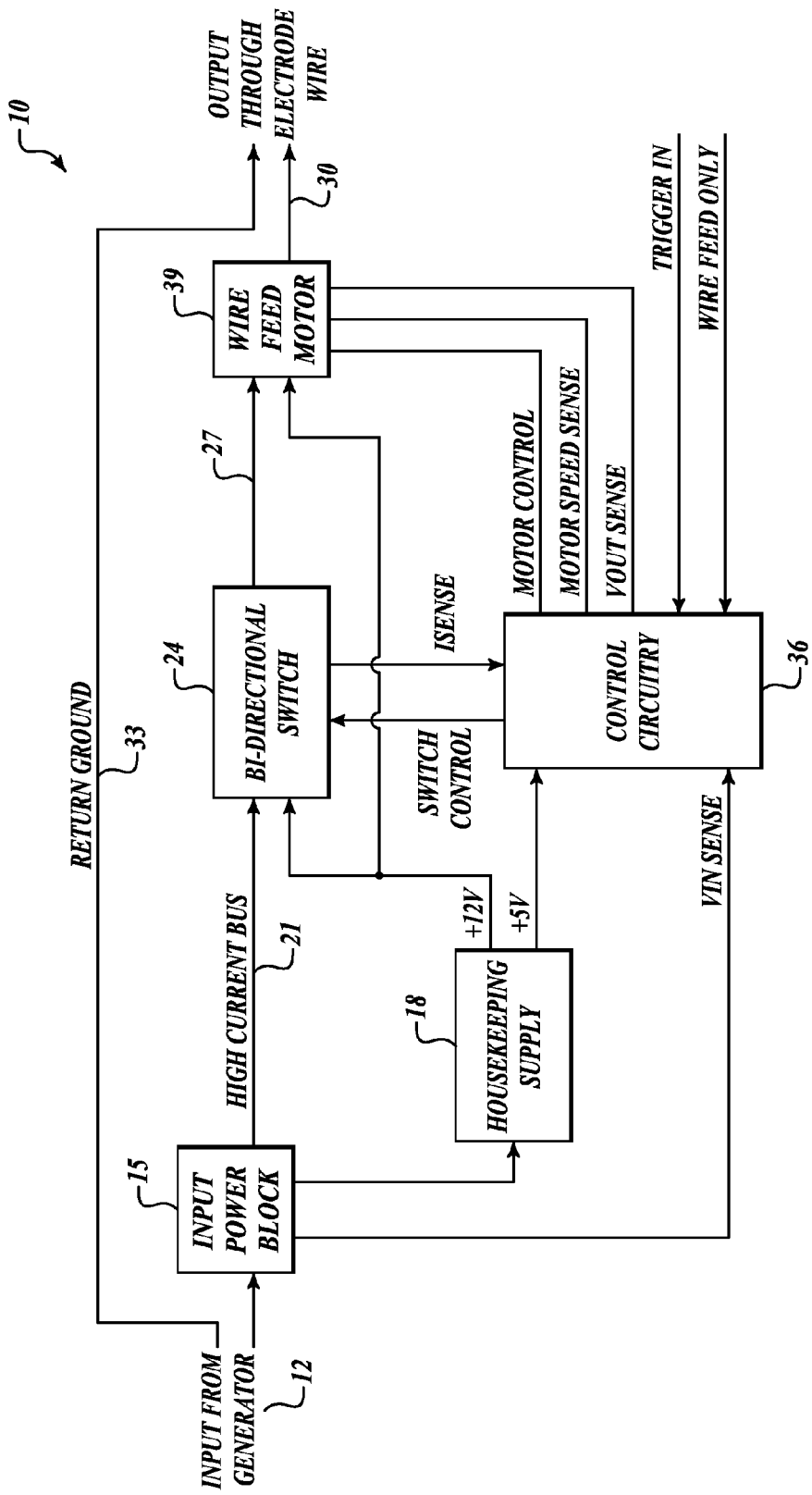
FIG. 1 is an overview of an exemplary wire feed welder using an embodiment of the invention.

FIG. 1 is an overview of an exemplary wire feed welder 10 using an embodiment of the invention. One such embodiment may be advantageously incorporated into the existing LN-25 wire-feeding welder manufactured by Lincoln Electric™. The LN-25 is a semiautomatic constant speed wire feeder for MIG and flux-cored arc welding applications and is designed for versatility and portability in a variety of field applications. For clarity, the embodiment is discussed in the context of a contactor board installed in the LN-25, though the invention is not limited by the discussion of such an embodiment.

The wire feed welder 10 includes means of receiving power through a source power connection 12. The received power flows throughout the welder from an input power block 15. The input power block 15 feeds logical power to an onboard power rectifier known as a housekeeping power supply 18.

The housekeeping power supply 18 may optionally be configured to convert a wide range of input voltages at the input power block 15 to voltages required by logical circuits within the welder. In a presently preferred embodiment, the housekeeping power supply 18 provides voltages sufficient for driving logical functions of the wire feed welder 10, including logical levels of five and twelve volts.

Typical voltage and current requirements for arc welders are 20 V to 50 V at 50 A DC to 500 A DC with low ripple for optimum weld quality. Thus, the input power block 15 must supply such power to an arc through a high current bus 21. To control the current arriving at the arc, the power in the high current bus 21 is suitably switched, to pulse modulate the current, at a set of banked switches 24. The banked switches 24 then feed power to the arc through an appropriate terminal on a wire feed motor 39 thereby supplying the pulse modulated current to an electrode wire to form the arc.

The banked switches 24 are to be driven by a control circuit assembly 36. In a preferred embodiment, the control circuit assembly 36 monitors input voltage at the input power block 15, output voltage and output current at the banked switches 24, and motor speed at the wire feed motor 39 to control the output as pulse modulated by the banked switches 24. An algorithm of control is defined by an electrode wire type including flux material and by a type of metal to be welded. Algorithms may be pre-programmed into the microcontroller for several wire types.

Figure 2:
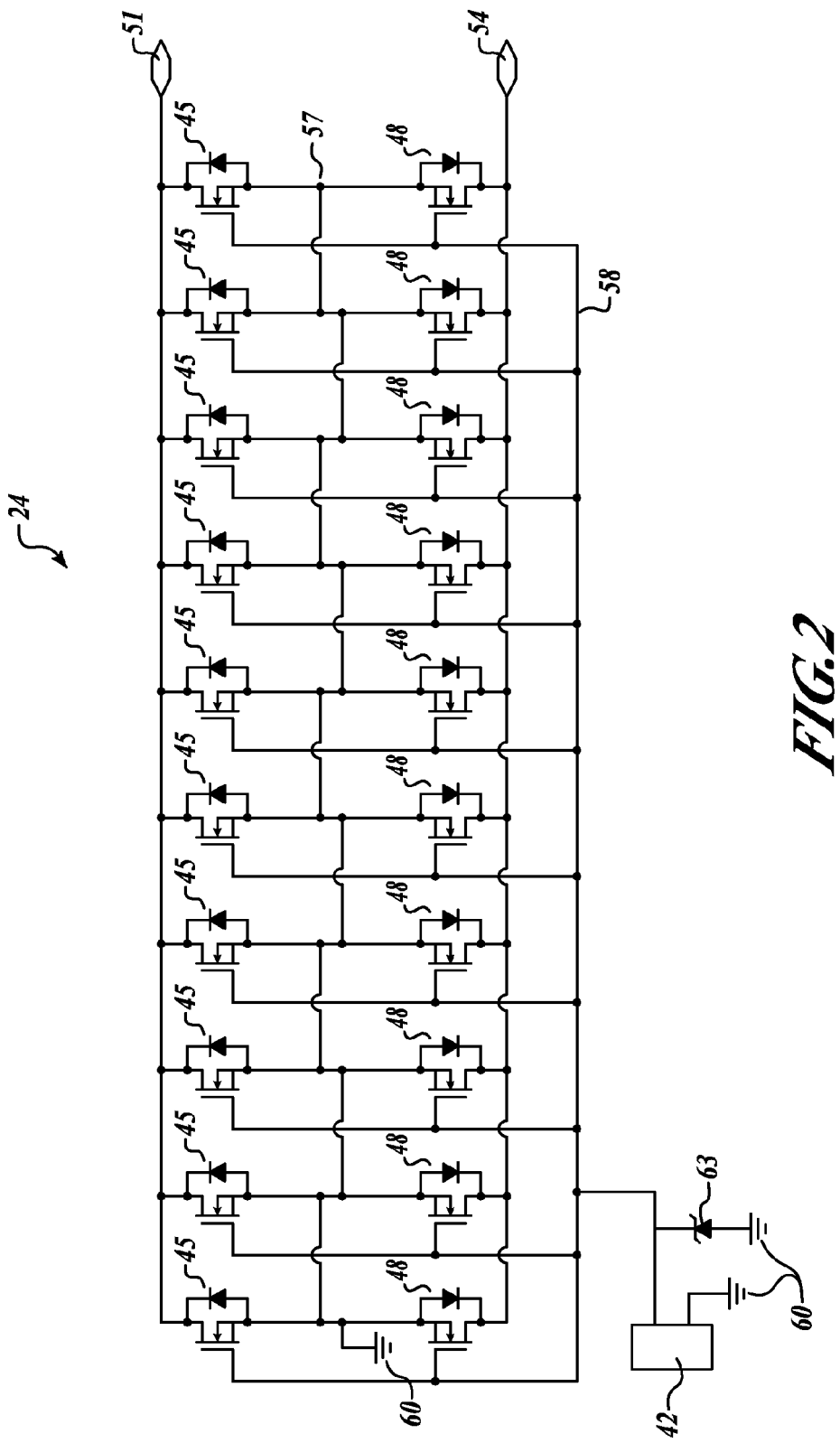
FIG. 2 is a schematic diagram of a solid-state bilateral banked switch.

FIG. 2 is a schematic diagram of a solid-state bilateral banked switch 24. The banked switch 24 includes at least one FET 45 between a ground bus 57 and a first power rail 51. Optionally, the banked switch 24 can include at least one FET 48 between the ground bus 57 and a second power rail 54. Closing switches 45 and 48 allows power to flow from the first power rail 51 and the second power rail 54 through the ground bus 57 into the relative ground 60. Energizing a contact in a connector 42 makes the current available to the welder.

As configured in the presently preferred embodiment, the first and second power rails 51, 54 together and the ground bus 57 serve as terminals for a switch. An independent power source (not shown) with output within the tolerance of the FETs 45, 48 may be connected with one terminal connected to first and second power rails 51, 54 and the opposite polarity to a gating rail 58. Activating the FETs 45, 48 will close the switch regardless of the polarity of the connection to the power source. The floating voltage will not adversely affect the remainder of the circuit. In the presently preferred embodiment, heat sinks (not shown) for the FETs 45, 48 serve as the terminal blocks for the first polarity of the power source allowing for production economies.

The second terminal of the connector 42 energizes the gating rail 58 to energize the welder electrode wire. To limit the voltage across the FETs 45, 48 a Zener diode 63 spans the terminals of the connector 42. The Zener diode 63 selected for the presently preferred embodiment has a breakdown voltage of 16.8–19.1 volts.

As the presently preferred embodiment has been described herein, the banked switch 24 allows for an extremely versatile substitute for mechanical contactors. Suitably energizing the gating rail 58 closes the switch instantaneously and removing the energizing potential from the gating rail 58 can open the switch just as quickly. Thus, the presently preferred embodiment can serve not only as a switching device but also, at higher speeds, as a pulse width modulator allowing control of the current flowing through the first and second power rails 51, 54 to the welding arc. Thus, by controlling the current, higher quality welds are more easily reproducible.

Figure 3:
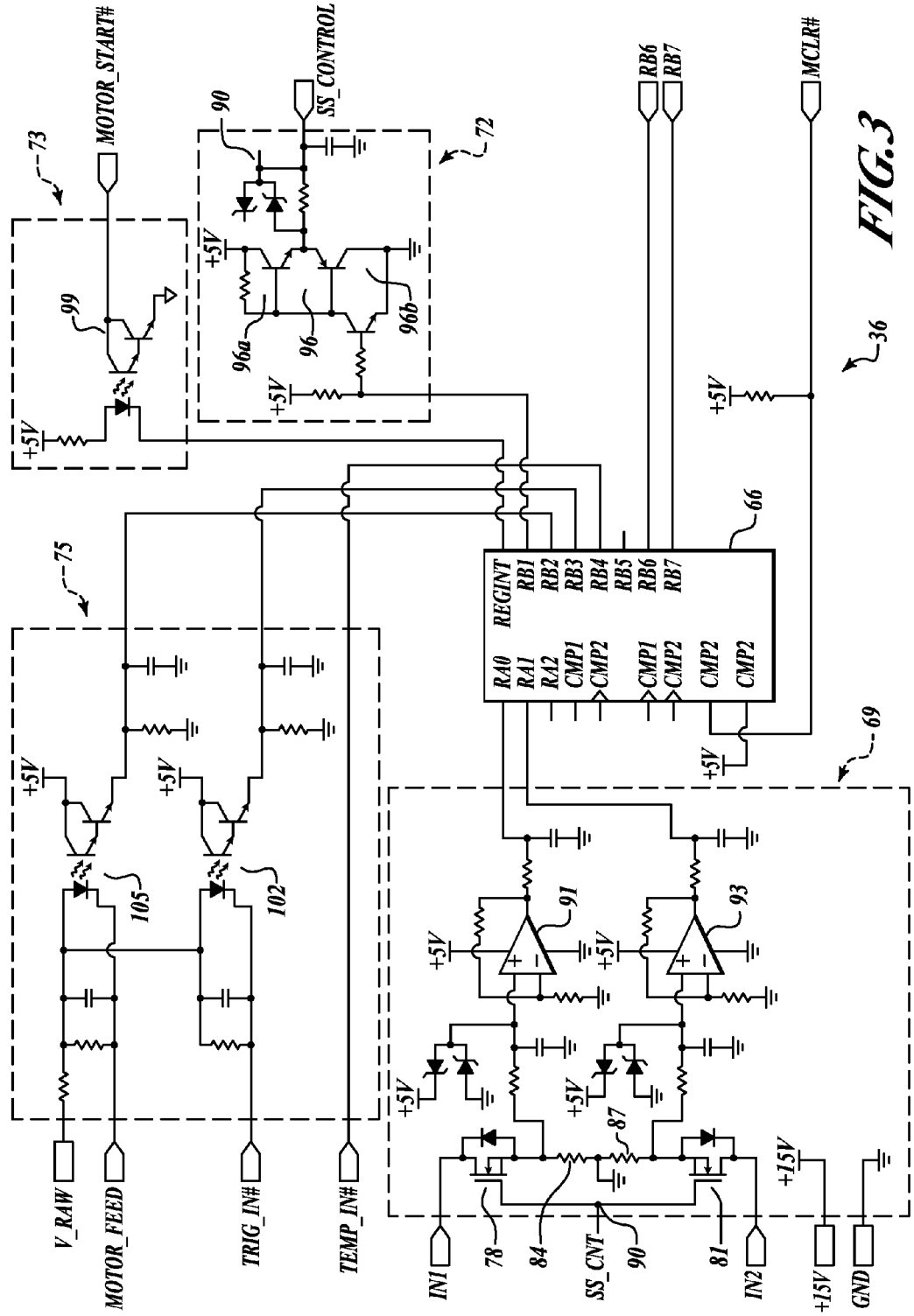
FIG. 3 is a schematic diagram of control circuit assembly for the solid-state banked switch.

FIG. 3 is a schematic diagram of control circuit assembly 36 for the solid-state banked switch. The control circuit assembly 36 includes a controller 66, a current sensing circuit 69, a driver circuit 72, a feed motor activation circuit 73, and a monitor circuit 75. The control circuit assembly 36 supports the input and output functions of the controller 66.

The controller 66 for the presently preferred embodiment is a controller selected from the PIC16CXX family of low-cost, high-performance, CMOS, fully-static, 8-bit microcontrollers, employing an advanced RISC architecture. The selected controller 66 includes a flash program memory allowing the storage of an executable program. As configured in the presently preferred embodiment, the controller 66 uses a port assignment as follows:

| PORT A | | |
|---|---|---|
| | Bit 0: SENSE1 | >2.97 V is an overcurrent |
| | Bit 1: SENSE2 | >2.97 V is an overcurrent |
| PORT B | | |
| | Bit 0: MOTOR_START | active LO |
| | Bit 1: SS_CNTL | active LO |
| | Bit 2: MOTOR_FEED_IN | active HI |
| | Bit 3: TRIG_IN | active HI |
| | Bit 4: TEMP_IN# | active LO |

As is evident in the port assignment, the controller 66 exploits the programmable comparator function to sense a voltage at either bit at PORT A. These two inputs sense the voltage across each of the FETs 48, 48 (FIG. 2) to determine current flowing to the welding arc. Additionally, Bits 2 through 4 of PORT B will be configured to receive a signal from the several functions within the welder. Bit 2 is configured to monitor a wire feed motor to indicate the outflow rate of a wire feeder. Bit 3 is configured to receive an indication of a trigger position on an arc welder handle. Bit 4 is configured to receive an indication of the operating temperature of the FETs 48, 48 (FIG. 2) to allow the controller 66 to stop the operation of the switch when the operating temperature is beyond the operating range of the FETs 48, 48 (FIG. 2).

The current sensing circuit 69 includes two voltage dividers, a first voltage divider including logic FET 78 and the resistor 84, and the second voltage divider, its mirror, including logic FET 81 and resistor 87. The first and second voltage dividers measure the potential respectively across the FETs 48, 48 (FIG. 2) using the $R_{D(on)}$ of the logic FETs 78, 81 as the value of first legs of the voltage dividers.

Operational amplifiers 91, 93 scale the voltage from respective voltage dividers to within the operating levels of the controller 66, PORT A, Bits 1 and 2. Configured as they are in the presently preferred embodiment, operational amplifiers 91, 93 present voltages that represent a value for current through the welding arc when the FETs 48, 48 (FIG. 2) are conductive.

Using the voltages garnered at the controller 66, PORT A, Bits 1 and 2, the controller 66 can pulse-width modulate the current flowing into the welding arc by alternately energizing and grounding the gating rail 58 (FIG. 2). A logical high applied at the gating node 90 coincides with that same logical high presented at the gating rail 58 (FIG. 2) allowing the next measurement of the current through the FETs 48, 48 (FIG. 2) which will allow the controller 66 to configure the next pulse.

In the presently preferred embodiment, two logic levels are necessary to drive the various functions of the control circuit assembly 36, five and twelve volts. To allow the controller 66 output at PORT B, bit 1 with a logical high of five volts to drive the logic FETs 78, 81 requiring twelve volts, a driver circuit 72 is used. The driver circuit 72 includes a triggerable voltage divider 96 including two driver FETs 96a, 96b. The logical high at the controller 66 output at PORT B, bit 1 raises the gate voltage on the two driver FETS 96a, 96b to place a twelve volt potential on the gating node 90, thereby activating the FETs 48, 48 (FIG. 2) and the logic FETs 78, 81.

The feed motor activation circuit 73 receives the logical high from the controller 66 output at PORT B, bit 0. The logical high from the controller 66 output at PORT B, bit 0 may be advantageously used to drive a logic circuit to activate the wire feed motor. A motor optical isolator 99 is used in the presently preferred embodiment. The motor optical isolator 99 is an optically coupled isolator containing a GaAs light emitting diode and an NPN silicon Darlington-connected phototransistor. Optical isolation prevents transient currents that might be present in power application such as an arc welder to damage the control circuit assembly 36.

Similarly, the monitor circuit 75 includes optical isolators 102 and 105. The monitor circuit receives signals indicative of the input voltage at the input power block 15, the motor feed from the wire feed motor 39, and the trigger state that are advantageously isolated from the control circuit assembly 36. The signals are then received at the controller 66 input at PORT B, bits 3 and 2 respectively.

Figure 4:
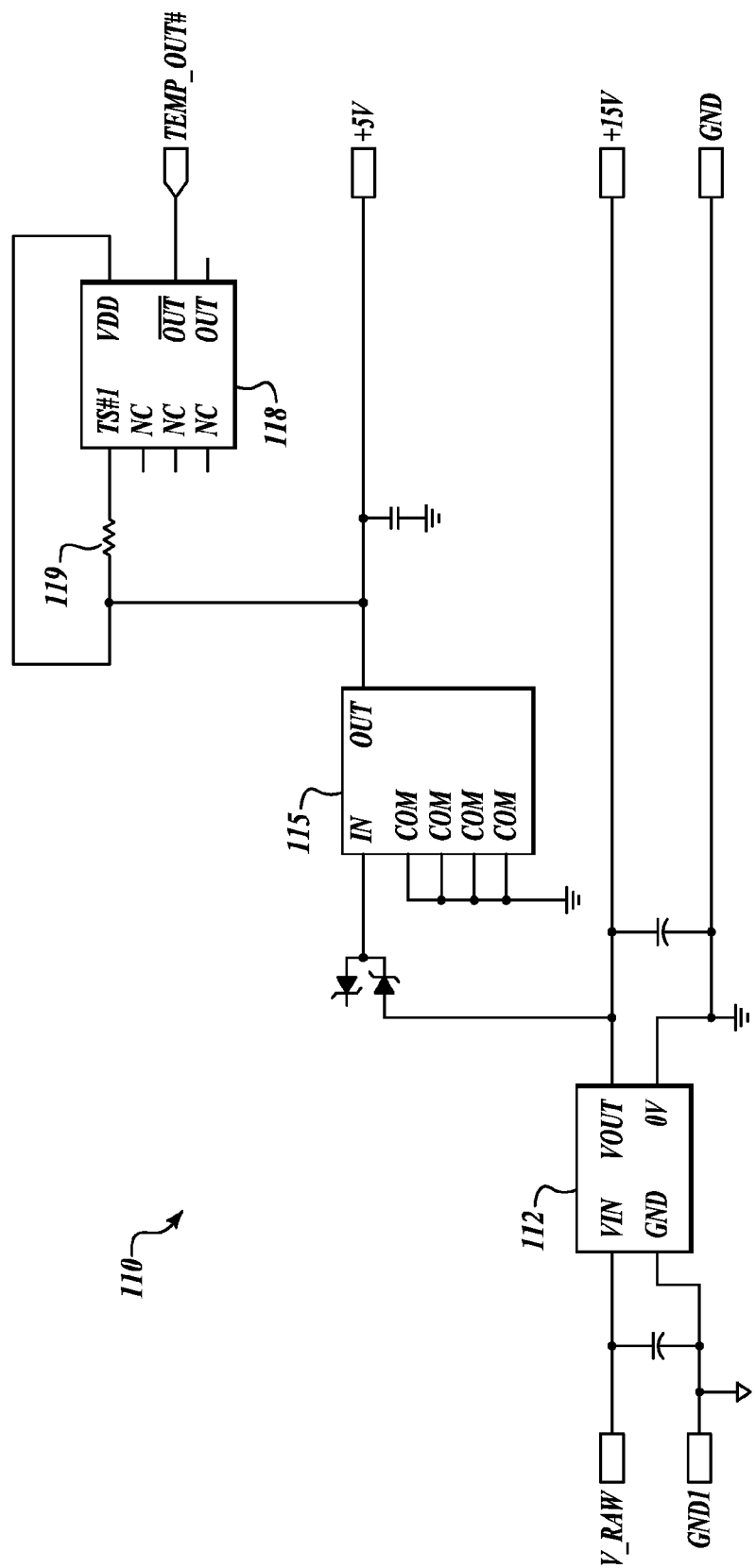
FIG. 4 is a schematic diagram of a thermal sensor circuit with power take-offs.

The controller 66 input at PORT B, bit 0 receives the ambient temperature of the FETs 48, 48 (FIG. 2). FIG. 4 is a schematic diagram of a thermal sensor circuit 110 with power take-offs. The thermal sensor circuit 110 monitors the ambient temperature of the bi-directional switch by means of single point temperature detector 118 programmed with a single external resistor 119 to a selected suitable upper extreme operating temperature for the FETs 48, 48 (FIG. 2). Mounted on the heat sink in proximity to the FETs 48, 48 (FIG. 2), the single point temperature detector 118 provides a logical high to controller 66 (FIG. 3) input at PORT B, bit 0 (FIG. 3) when the operating temperature range is exceeded, causing the processor to shut down the FETs 48, 48 (FIG. 2) by grounding the gating rail 58 (FIG. 2).

Also included in the thermal sensor circuit 110 is a voltage regulator 115 to provide suitable five volt power, from a source power of fifteen volts, to the logical circuits of the control circuit assembly 36 (FIG. 3) including the single point temperature detector 118. The thermal sensor circuit 110 further includes a DC to DC converter 112 used to condition the power supplied to the voltage regulator 115 as well as providing the source power of fifteen volts.

As indicated, the controller 66 (FIG. 3) can execute a program stored in memory within the controller 66. FIG. 5 is a truth table that defines the basic operation of the controller 66. As discussed above, the controller 66 (FIG. 3) may additionally be used to cause the banked switch 24 to pulse-width modulate the current flowing into the welding arc, however, the basic operation of the controller relates to the propriety of energizing the gating rail 58 (FIG. 2) under certain conditions.

Elements of each of the conditions in question are set forth in five columns a, b, c, d, and e such that an entire condition is set forth in a row such as in a row 124 where element 124a indicates that the wire feed motor is running (sensed as the logical high from the controller 66 output at PORT B, bit 1), an over current condition across the first FET 54 is irrelevant (sensed as the logical high from the controller 66 output at PORT A, bit 0), an over current condition across the first FET 57 is irrelevant (sensed as the logical high from the controller 66 output at PORT A, bit 1), an over temperature condition (sensed as the logical high from the controller 66 output at PORT B, bit 0), and the trigger is depressed (sensed as the logical high from the controller 66 output at PORT A, bit 3), indicates a desired resultant condition that the motor should be in the logical high at 124q and the gating rail 58 (FIG. 2) is in the logical low at 124r.

In each of the several conditions, 124, 126, 128, 130, and 132, the gating rail is to remain unenergized as indicated at the boxes 124r, 126r, 128r, 130r, and 132r. Such situations prevent unintentional or inappropriate energizing of the gating rail 58 (FIG. 2). Welding operation is only defined in the single condition 134 where at box 134a the motor feed is running, at a box 134b the current through FET 54 is suitably low, at a box 134c, the current through FET 57 is suitable low, at a box 134d the temperature of the FETs 48, 48 is suitably low, and at a box 134e the trigger is depressed. As a result of the conditions, at a box 134r, the controller 66 puts or keeps the motor in the on position, and at a box 134s, the controller 66 energizes the gating rail 58 (FIG. 2).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A solid-state contactor for an arc welder, the contactor comprising:
   a controller assembly being configured to generate a logical triggering signal, the controller assembly including:
   an input including:
   an input stage configured to receive a logical signal indicative of a trigger being depressed:
   an input stage configured to receive a signal indicative of a volume of current at a welding arc: and
   an input stage configured to receive a logical signal indicative of activation of a wire feed motor:
   an output; and
   a processor, the processor being configured to generate the logical triggering signal at the output based upon the received signals indicative of the volume of current and of the activation of the wire feed motor; and
   a switch configured to conduct electrical current from a power source to a wire conductor in response to the logical triggering signal at the output.

2. The contactor of claim 1, wherein the signal indicative of a volume of current is a logical signal indicating a volume of current exceeding a threshold current value.

3. The contactor of claim 1, wherein:
the signal indicative of a volume of current at a welding arc is generated at a current sensor in communication with the input, the current sensor being configured to sense the electrical current flowing from the power source to the wire conductor.

4. The contactor of claim 1, wherein:
the input includes an input stage configured to receive a signal indicative of a temperature sensor in communication with the input, the temperature sensor being configured to sense a temperature of the switch; and
the output is further based upon the signal indicative of the temperature.

5. The contactor of claim 1, wherein the signal indicative of activation of a wire feed motor
is generated at a wire speed sensor in communication with the input, the wire feed sensor being configured to sense a speed of the wire feed.

6. The contactor of claim 1, wherein the switch is a transistor.

7. The contactor of claim 6, wherein the transistor is a field effect transistor.

8. The contactor of claim 1, wherein the logical signal the output is configured to pulse-width modulate the electrical current flowing from the power source to the wire conductor.

9. An arc welding machine including a solid-state contactor, the contactor comprising:
a power source, the power source being configured to provide an electrical current;
a controller assembly being configured to generate a logical triggering
signal, the controller assembly including:
an input including:
an input stage configured to receive a logical signal indicative of a trigger being depressed;
an input configured to receive a signal indicative of a volume of current at a welding arc; and
an input configured to receive a logical signal indicative of activation of a wire feed motor;
an output; and
a processor, the processor being configured to generate the logical triggering signal at the output based upon the received signals indicative of the volume of current and of the activation of the wire feed motor; and
a switch configured to conduct electrical current from a power source to a wire conductor in response to the logical triggering signal at the output.

10. The welding machine of claim 9, wherein the signal indicative of a volume of current is a logical signal indicating a volume of current exceeding a threshold current value.

11. The welding machine of claim 9, wherein:
the signal indicative of a volume of current at a welding arc is generated at a current sensor in communication with the input, the current sensor being configured to sense the electrical current flowing from the power source to the wire conductor.

12. The welding machine of claim 9, wherein:
the input includes an input stage configured to receive a signal indicative of a temperature sensor in communication with the input, the temperature sensor being configured to sense a temperature of the switch and
the output is further based upon the signal indicative of the temperature.

13. The welding machine of claim 9, wherein:
the signal indicative of activation of a wire feed motor: is generated at a wire speed sensor in communication with the input, the wire feed
sensor being configured to sense a speed of the wire feed.

14. The welding machine of claim 9, wherein the switch is a transistor.

15. The welding machine of claim 14, wherein the transistor is a field effect transistor.

16. The welding machine of claim 9, wherein the logical signal at the output is configured to pulse-width modulate the electrical current flowing from the power source to the wire conductor.

17. A method for welding with an arc welding wire feed machine, the method comprising:
receiving a signal indicative of depression of a trigger;
receiving a signal indicative of feeding a wire electrode at a welding arc;
receiving a signal indicative of a current volume at the welding arc;
conducting an electrical current from a power source to a drain of at least one transistor; and
energizing a gate of the at least one transistor, in response to the signals indicative of depression of the trigger, feeding the wire electrode, and the volume of current at the welding arc, the transistor configured to admit an electrical current from the power source to a wire conductor in response to energizing the gate.

18. The method of claim 17, further comprising:
comparing the signal indicative of the volume of current to a reference value; and
de-energizing the gate when the magnitude exceeds the reference value.

19. The method of claim 18, further comprising:
re-energizing the gate when the signal indicative of the volume of current is less than the reference value.

20. The method of claim 17, further comprising:
monitoring a magnitude of a temperature of the at least one transistor;
comparing the magnitude to a reference value; and
de-energizing the gate when the magnitude exceeds the reference value.

* * * * *